Aug. 26, 1969   J. L. EVANS ET AL   3,463,182

CONSTANT PRESSURE FLUID REGULATOR

Filed April 10, 1967   3 Sheets-Sheet 1

*INVENTOR.*
JOHN L. EVANS
HUGH E. RIORDAN
BY
*Karl A. Ohalik*
ATTORNEY

Aug. 26, 1969 J. L. EVANS ET AL 3,463,182
CONSTANT PRESSURE FLUID REGULATOR

Filed April 10, 1967 3 Sheets-Sheet 2

INVENTOR.
JOHN L. EVANS
HUGH E. RIORDAN
BY

ATTORNEY

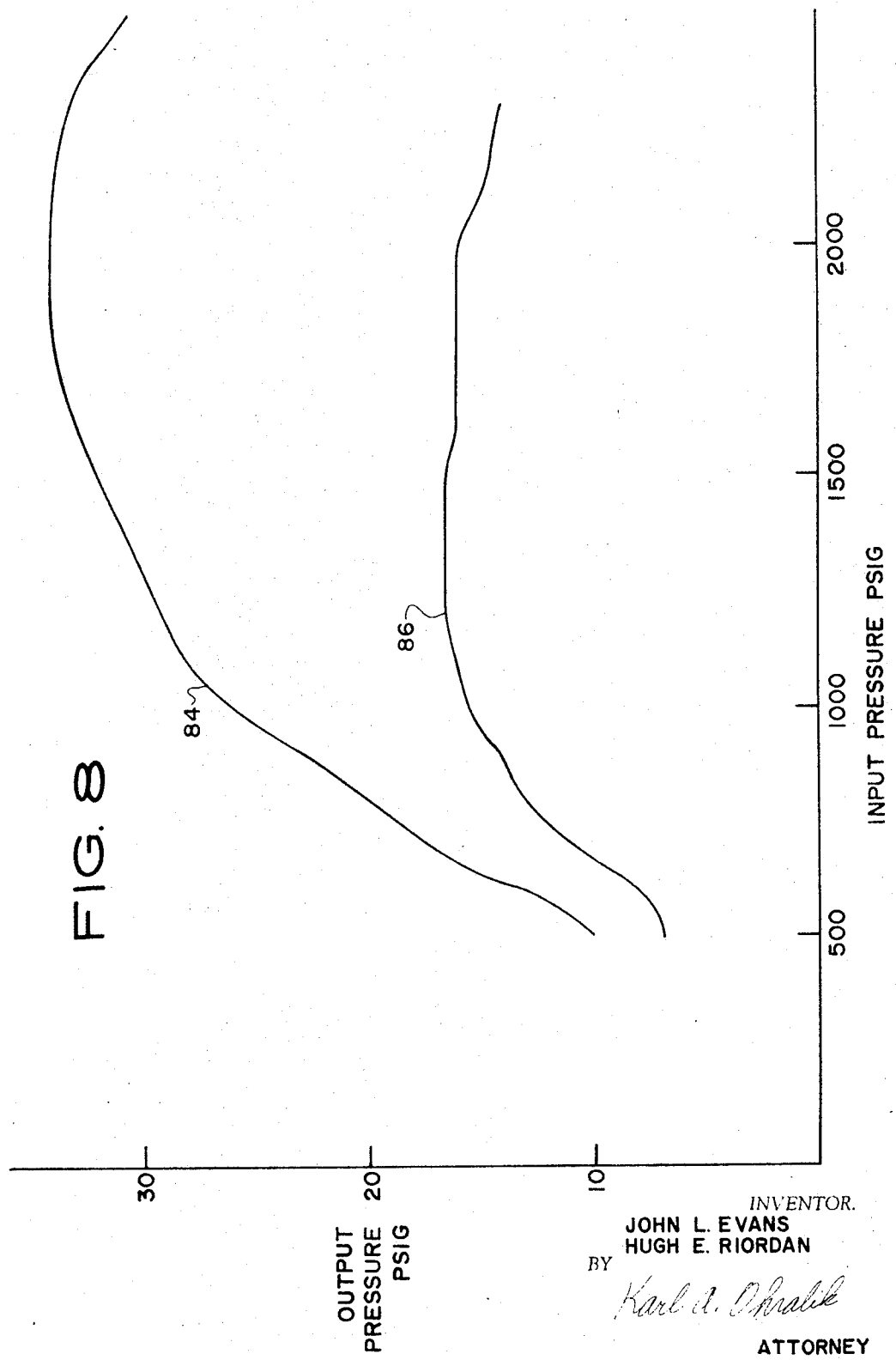

United States Patent Office 3,463,182
Patented Aug. 26, 1969

3,463,182
CONSTANT PRESSURE FLUID REGULATOR
John L. Evans, Oakland, and Hugh E. Riordan, Wyckoff, N.J., assignors to Singer-General Precision, Inc., Little Falls, N.J., a corporation of Delaware
Filed Apr. 10, 1967, Ser. No. 629,635
Int. Cl. F16k 31/385
U.S. Cl. 137—494          7 Claims

ABSTRACT OF THE DISCLOSURE

A constant output pressure regulator comprises a rigid enclosure with a deformable diaphragm separating the enclosure into two regions. Inlet and outlet in the enclosure communicate with these respective regions. The diaphragm may be impervious except for an orifice therein and in an initial position of the diaphragm, it closes the inlet orifice. Under inlet pressure sufficiently in excess of outlet pressure, it is deformable away from such closure position to admit fluid into the first region and it then passes successively to the second region through the diaphragm orifice and then through the outlet orifice. The sizes of the various orifices and diaphragm characteristics are proportioned relative to each other to provide substantially constant output pressure.

An alternative embodiment comprises a structure differing from that described above in that the inlet orifice communicates with a third region separated from the mentioned first region by a deformable plate having an orifice establishing communication between first and third regions.

Alternatives to each of the described embodiments are (1) the provision of a porous diaphragm in lieu of the orificed one, and an impervious cover on a localized portion of the diaphagm for contact with the shoulder of the inlet orifice, (2) a porous plug covering the orifice in the impervious diaphragm, and (3) a precise orifice in a jewel or other material covering a less precise orifice in the diaphragm.

Background of the invention

This invention relates to the control of fluid and more particularly to maintaining and delivering fluid under constant pressure from a variable pressure source.

Constant output pressure fluid regulators are well-known and in the main comprise, among other discrete elements, a diaphragm against which fluid pressures are applied, some type of plunger or piston as an aperture control element and a spring means for maintaining a bias force against the plunger.

Because of certain inherent advantages of fluidic control systems over equivalent electrical or electronic systems in certain environments such as those subjected to high radiation intensities or high extremes of temperature, a more extensive application of fluidic systems is being made. In vehicles constructed to traverse outer space in which these types of environments may be encountered, it is also very important that all necessary components be small and light in weight. In certain cases such as in earth satellites, because of lack of opportunity to repair components once the vehicle is launched or in the case of missiles carrying warheads demanding accuracy of flight, a high degree of reliability and accuracy are imposed as requirements upon the control components of such vehicles. Since a concomitant of simplicity is reliability, simplicity is a desideratum of such components. In prior art fluidic systems, the constant pressure output regulators are components which are subject to improvement in regard to size, weight and simplicity.

Summary of invention

In accordance with this invention, a simplified and reliable constant output pressure regulator is provided by a rigid enclosure with inlet and outlet and a deformable diaphragm separating the interior of the enclosure into two regions. One region is in direct communication with the outlet orifice and the other is in communication with the inlet orifice under control of the diaphragm which in an initial condition closes the inlet orifice. Communication between regions is established by either an orifice through the diaphragm or pores therein, depending upon its particular construction. Alternatively, a third region is provided into which fluid is introduced from the inlet and this region is separated from the first by a deformable plate having an orifice establishing communication between these regions.

In either case, the diaphragm responds to sufficient excess of inlet pressure over outlet pressure, to deform away from the inlet orifice to admit fluid into the regulator. By properly proportioning of orifice areas, diaphragm area and spring rate of diaphragm relative to each other, a substantially constant outlet pressure over a relatively wide range of inlet pressures may be obtained.

Brief description of the drawing

FIGURE 8 is a graph illustrating the response characteristics of the regulator shown in FIGURES 3 and 4 in terms of output pressure versus input pressure.

Description of the preferred embodiments

Figure 1:
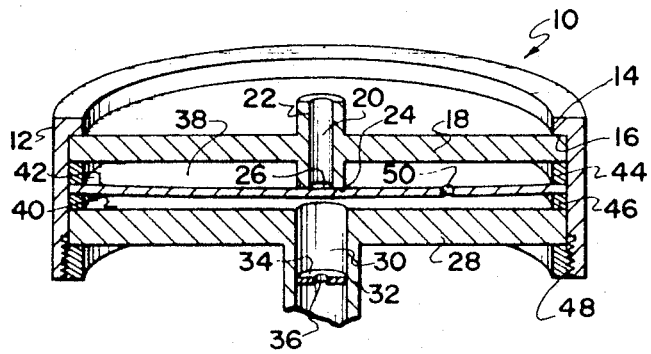
FIGURE 1 is a perspective, sectional elevation of a constant outlet pressure regulator according to one embodiment of this invention and in an initial condition thereof.

Referring now to the drawing for a detailed description of the invention, in FIGURE 1, 10 represents generally one embodiment of the present constant outlet pressure regulator. The regulator 10 comprises a body member 12 generally in the shape of a right circular cylinder and having an inwardly directed flange-line portion 14 providing a radial shoulder 16. A first rigid wall 18, generally of a disc shape with an outer diameter slightly less than the inner diameter of member 12 is provided and is in endwise abutment with the shoulder 16. The wall 18 is provided with a central opening, 20, communicating with an inlet tube 22 for accommodating inlet fluids. An inward extension of tube 22 provides an annular shoulder 24 about an inlet aperture 26.

The regulator includes a second rigid wall 28, also disc shaped and being accommodated within the body 12 because its outer diameter is slightly less than the inner diameter of body 12. The wall 28 is provided with a central aperture 30 communicating with an outlet tube 32. Representing the load on the regulator 10, an annular insert 34 is shown within tube 32 and has an outlet orifice 36. It should be understood that the load orifice 36 may be located in the outlet flow path at any distance from the regulator and will in general be part of the device being supplied with fluid from the regulator.

The interior of regulator 10 is separated into two regions, designated 38 and 40, by a deformable diaphragm 42 which is impervious except for an orifice 50 which facilitates passage of fluid from region 38 to region 40. The diaphragm 42 is of slightly smaller diameter than the interior of body 12 and is spaced from walls 18 and 28 by respective annular metal spacers 44 and 46, respectively, disposed between the diaphragm and the respective walls. Each spacer has an outer diameter slightly less than the inner diameter of the body 12.

For firmly securing the diaphragm in place, an annular member 48, exteriorly threaded to engage interior threads on the body 12, is provided and may be tightened to bear against wall 28 which in turn imparts force to the spacer 46, diaphragm 42 and spacer 44 against shoulder 16. Such force is sufficient, of course, to seal the interior of the regulator against leakage.

In an initial condition of regulator 10, that is, with no fluid applied to its inlet, the diaphragm 42 is in a position as shown in FIGURE 1 wherein it is centrally deformed or displaced by shoulder 24. Such deformation prestresses the diaphragm whereby it bears against the shoulder 24, closing the aperture 26.

Figure 2:
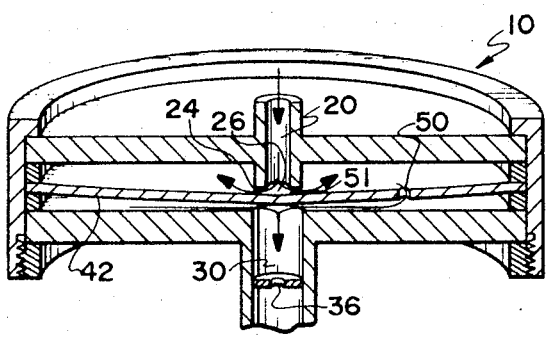
FIGURE 2 is a perspective, sectional elevation of the regulator shown in FIGURE 1 in a condition in which the inlet pressure is sufficiently greater than the outlet pressure so as to overcome the spring bias of the diaphragm to deform the same and admit fluid therein.

In response to the application of fluid under increased pressure to the inlet tube 22 of regulator 10 and providing that the inlet pressure is sufficiently great so as to be in excess of the pressure of the fluid at the outlet orifice 36, respectively, and orifices 50 are "sonic"; that is, that diaphragm 42 is further deformed so as to become spaced from the annular shoulder 24 as shown in FIGURE 2 of the drawings. This additional diaphragm deformation establishes an orifice 51 with an annular periphery of the same size as the aperture 26 and a height equal to the spacing between the diaphragm and shoulder 24. Under these circumstances, fluid passes through the inlet aperture 26 and orifice 51, into the region 38. Since the orifice 50 establishes communication between regions 38 and 40, the fluid then passes from region 38 through this orifice and into the region 40 from which it passes successively through the opening 30 and outlet orifice 36.

As a condition of proper operation of the regulator 10, it is assumed that the inlet and outlet orifices, 51 and 36, respectively, and orifices 50 are "sonic;" that is, that the differential of pressure on the respective sides of each orifice is equal to or greater than 1/.53, or in other words, that sonic disturbances will not pass from the low pressure side of the orifice through the orifice into the high pressure side of the orifice. In this condition the following relationship holds:

(1) $\qquad P_0 A_0 = P_1 A_1 = P_2 A_2$ wherein $P_0$, $P_1$, and $P_2$ represent the pressures in inlet tube 22, region 38, and region 40, respectively, and $A_0$, $A_1$, and $A_2$ represent areas of orifices 51, 50, and 36 respectively.

Also the forces acting on the diaphragm 42 are expressed by the equation:

(2) $\qquad P_0 A_{d_0} + P_1 A_{d_1} = P_2 A_{d_1} + K\Delta$ wherein $A_{d_0}$ is the area of the diaphragm 42 which is exposed to the inlet aperture 26, $A_{d_1}$ is the area of the diaphragm exposed to region 38, K is the spring rate of the diaphragm, and $\Delta$ is the magnitude of deflection of the diaphragm.

The area, $A_0$, of orifice 51 is therefore expressed by the equation:

$$A_0 = \frac{P_0 A_{d_0} + P_1 A_{d_1} - P_2 A_{d_1}}{\frac{K}{l}} + A_0'$$

wherein $l$ is the peripheral length of the inlet about the shoulder 24, and $A_0'$ is an imaginary orifice taking into account the initial prestress of diaphragm 42 closing orifice 26. That is, in a prestressed condition of the diaphragm, $A_0'$ is a negative value representing in effect the amount of force necessary to just open the orifice; in a zero prestressed condition and wherein the diaphragm just closes orifice 51, $A_0'$ is also zero; and in an initial condition wherein the diaphragm is spaced from the shoulder 24, $A_0'$ is some positive value Substituting the Equation 3 into Equation 1 yields:

$$P_2 A_2 = P_0 A_0' + \frac{P_0^2 A_{d_0} + P_0 P_2 \left(\frac{A_2}{A_1}\right) A_{d_1} - P_0 P_2 A_{d_1}}{\frac{K}{l}}$$

Regulation, that is, constant output pressure, occurs when the first derivative of $P_2$ with the respect to $P_0$ is equal to 0, that is, $$\frac{dP_2}{dP_0} = 0$$

(5) $\qquad \frac{dP_2}{dP_0} = 0 = \frac{KA_0'}{l} + 2P_0 A_{d_0} + P_2 A_{d_1}\left(\frac{A_2}{A_1} - 1\right)$ Thus, Equation 5 represents the condition, or in other words, the manner in which the orifices, diaphragm spring rate and pressures are to be interrelated with respect to each other so as to produce constant output pressure, or in other words, regulation.

When the supplied pressure applied to inlet tube 22 of regulator 10 is off, the spring bias of diaphragm 42 closes the entrance orifice 51 at shoulder 24. However, as the inlet pressure increases and becomes sufficiently great, the gas flows into the region 38 and passes through to region 40 through the orifice 50. If the pressure within region 40 increases as a result of a disturbance, the increased pressure tends to close the entrance orifice into region 38. Also, if the presure in region 40 decreases, the decreased forces open the entrance orifice. Thus, regulation is achieved.

In accordance with the foregoing description, it is clear that the spring and the diaphragm which form separate entities in prior regulators are herein embodied into a single element and that the present construction of the regulator provides a rugged device, insensitive to large accelerations and to temperature variations and has no moving or rubbing parts. Thus, an accurate and reliable pressure regulating apparatus is provided.

It should also be noted that in accordance with Equation 5, considerable latitude is afforded in the construction of the individual elements of regulator 10 to provide the desired performance. Areas of orifices, the diaphragm spring rate and prestress may be varied, however, always with a change in any one or more of the other factors to satisfy this equation. As an example, depending upon the circumstances, in one case it may be desirable that $A_0'$ be negative and in another case it may be desirable that $A_0'$ be zero or positive rather than negative, whereby diaphragm 42 would not be prestressed nor initially spaced from orifice 26. From one case to the other, the factors of Equation 5 only need be proportioned to satisfy the equality.

Figure 3:
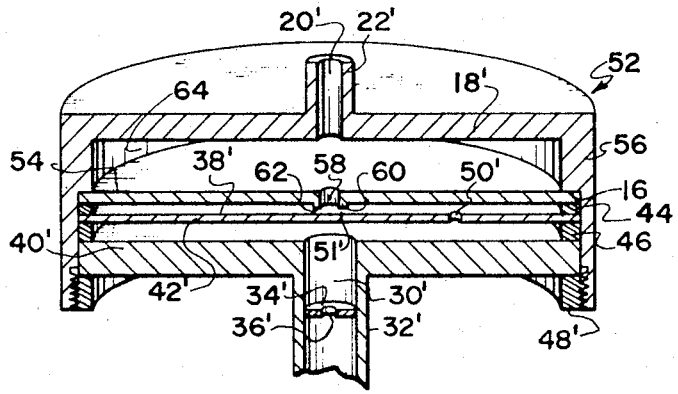
FIGURE 3 is a perspective, sectional elevation of a constant outlet pressure regulator according to another embodiment of this invention and in an initial condition thereof.
Figure 4:
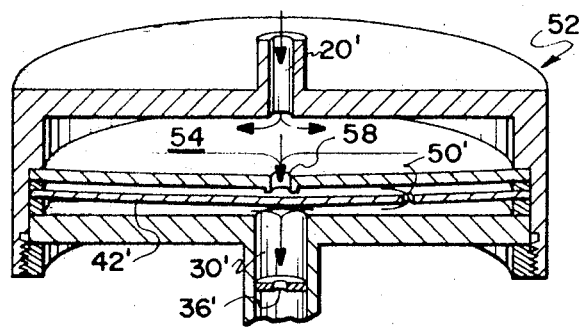
FIGURE 4 is a perspective, sectional elevation of the regulator shown in FIGURE 3 in a condition in which the inlet pressure is sufficiently great to deform the diaphragm and bendable plate thereof against the outlet pressure and the inherent spring bias of these members.

In FIGURES 3 and 4 of the drawing showing another embodiment of constant output pressure regulator according to this invention, components corresponding to similar components in FIGURES 1 and 2 of the drawing are designated by the same reference numerals primed ('). In FIGURES 3 and 4, the regulator is represented generally at 52 and includes a body member 56 shown generally as an inverted cup-shaped member and includes in addition to the diaphragm 42' and spacers 44' and 46', a second deformable, impervious plate or diaphragm 54 having an outer diameter just slightly less than the inner diameter of the body member 56 and in endwise abutment with a shoulder 16' in the body member 56. The diaphragm 54 is provided with a central orifice 58. Surrounding the orifice 58 and along the side of the diaphragm 54 adjacent to the diaphragm 42' is provided a protruding lip 60 terminating in an annular shoulder 62 movable from a position in contact with the diaphragm 42' to positions removed therefrom for controlling the extent of fluid flow through the orifice 51' into the region 38'. As seen in FIGURES 3 and 4 of the drawing, between the upper surface of diaphragm 54 and the wall 18', is another region designated 64 into which the fluid flowing from the inlet orifice 20' is first received.

In accordance with this embodiment of invention, the diaphragm 54 may or may not be in an initial position whereby a shoulder 62 is in contact with the diaphragm 42' depending on various considerations in construction. However, as fluid is delivered to the input through orifice 20' into the region 64, pressure in this region becomes great enough to force the diaphragm 42' away from contact with the diaphragm 54 and open the orifice 51' formed by shoulder 62 and the adjacent diaphragm 42', if in the initial condition this orifice is closed. Or alternatively, if the orifice 51' is initially opened it becomes enlarged by reason of the applied fluid pressure. In any event, the sizes of orifices, spring rates of diaphragms and pressures involved may be proportioned and interrelated with respect to each other so as to provide regulation or in other words, a substantially constant output pressure. For this condition, it can be shown that the following equation applies:

$$A_0 = \frac{P_0 A_{d_0} + P_1 A_{d_1} - P_2 A_{d_1}}{\frac{K}{l}} - \frac{(P_0 - P_1) A_{d_1}}{\frac{K_1}{l}} + A_0'$$

where $K_1$ represents the spring rate of diaphragm 54.

Again, regulation or constant pressure output occurs when the first derivative of $P_2$ with respect to $P_0$ is equal to 0; that is, $$\frac{dP_2}{dP_0} = 0$$

$$\frac{dP_2}{dP_0} = 0 = \frac{KA_0'}{l} + 2P_0 A_{d_0} + P_2 A_{d_1}\left(\frac{A_2}{A_1} - 1\right)$$

$$- \left[\frac{KA_{d_1}}{K_1}(2P_0 - P_2)\right]$$

It is to be noted that Equation 7 differs from Equation 5 by the introduction of the bracketed term on the right, namely, $$-[K/K_1 A_{d_1}(2P_0 - P_2)]$$

Since this term is opposite in sign to that of the deflection bias term $K/lA_0'$, its effect is to lower the bias deflection of diaphragm 42'. Accordingly, the amount of force necessary to open orifice 51' is lessened.

Figure 5:
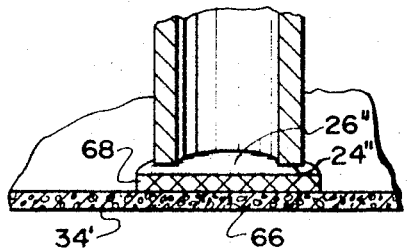
FIGURE 5 illustrates an alternative embodiment having a porous diaphragm and an impervious plate on the diaphragm abutting the shoulder about the input orifice.
Figure 6:
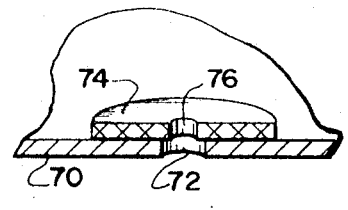
FIGURE 6 illustrates an alternative embodiment having a jewel with a precise orifice therein.

As described hereinabove, the diaphragms are impervious with the exception of the orifices 50, 50', and aperture 58 provided therein. However, in accordance with another embodiment of this invention, the diaphragms rather than being impervious but for the discrete openings therein, may be porous members as shown at 66 in FIGURE 5 of the drawing. However, an impervious member 68 is attached to the diaphragm 66 and disposed so as to engage the shoulder 24" to facilitate complete closure of the orifice 26" in response to tight engagement of these parts. A suitable material for the member 58 is a jewel, however, various other materials may also be utilized with facility.

In accordance with still another embodiment of this invention, a diaphragm 70 which is impervious in the manner that diaphragms 42, 42' and 54 are impervious may be provided with an orifice 72 to provide for flow of fluid therethrough. However, because of the relatively small sizes of the orifices involved in the diaphragm and because of the simplicity and facility with which accurate, small orifices can be made in jewels as contrasted with metals, provision is made for establishing a precise orifice for control of flow of fluid between the regions through a member 74 which may be a jewel, having an orifice 76 therein. Greater accuracy and economies are advantages of this construction.

Figure 7:
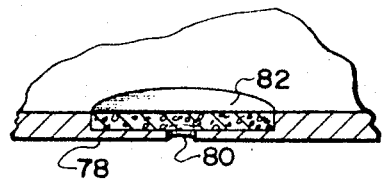
FIGURE 7 illustrates an alternative embodiment having an impervious diaphragm with a porous member interposed between the diaphragm orifice and one of the regions.

In still another embodiment of this invention as shown in FIGURE 7 of the drawing, a diaphragm 78, analogous to diaphragms 42 and 42', may be provided with an orifice 80 and a porous member 82 disposed in a recess of the diaphragm 78 covering the aperture 80.

The performance of the regulator shown in FIGURES 3 and 4 of the drawing is quantitatively shown in the graph of FIGURE 8 wherein the abscissa represents inlet pressure in pounds per square inch gauge and the ordinate represents the outlet presure in pounds per square inch gauge. The respective curves 84 and 86 represent the performance of two different constructions of this type regulator and wherein the diaphagms are of different sizes. As can be seen, good regulation can be achieved over a relatively wide range of inlet pressures.

What is claimed is:

1. A fluid regulator for maintaining a constant fluid outlet pressure comprising an enclosure having a pair of walls, an inlet orifice in one of said walls and an outlet orifice in the other of said walls, a deformable diaphragm separating the interior of said enclosure into two regions, each communicating with one of said orifices, said diaphragm being disposed to cover said inlet orifice in response to a differential pressure between said spaces less than a predetermined value, means establishing fluid communication between said regions through said diaphragm, said diaphragm being responsive to a differential of fluid pressure across its sides in excess of said predetermined value to deform and move away from said inlet orifice to increase communication between said inlet orifice and the adjacent one of said regions, wherein the spring rate, K, of the diaphragm; the peripheral length, $l$, of the inlet orifice; the inlet pressure, $P_0$; the area of the inlet orifice, $A_{d_0}$; the outlet pressure $P_2$; the area, $A_{d_1}$ of the diaphragm; the area, $A_2$, of the outlet orifice; the area, $A_1$, of the communication means between spaces and the hypothetical area $A_0'$ representing initial diaphragm stress are interrelated according to the formula $$\frac{KA_0'}{l} + 2P_0 A_{d_0} + P_2 A_{d_1}\left(\frac{A_2}{A_1} - 1\right) = 0$$

2. A fluid regulator for maintaining a constant fluid outlet pressure comprising an enclosure having a pair of walls, an inlet orifice in one of said walls and an outlet orifice in the other of said walls, a deformable diaphragm separating the interior of said enclosure into first and second regions, each communicating with one of said orifices, said diaphragm being disposed to cover said inlet orifice in response to a differential pressure between said spaces less than a predetermined value, means establishing fluid communication between said regions through said diaphragm, said diaphragm being responsive to a differential of fluid pressure across its sides in excess of said predetermined value to deform and move away from said inlet orifice to increase communication between said inlet orifice and the adjacent one of said regions, said fluid regulator additionally comprising a third region having an outlet orifice, the outlet orifice of said third region forming the inlet orifice of said first region, said one of said walls being a deformable wall means separating said first and third regions and being responsive to differential pressure thereacross to deform and control the area of said orifice establishing communication between said first and third regions.

3. A fluid regulator according to claim 2 wherein the spring rate, K, of the diaphragm; the spring rate $K_1$ of the deformable wall means; the peripheral length, $l$, inlet orifice, $A_{d_0}$; the outlet pressure $P_2$; the area $A_{d_1}$, of the diaphragm; the area, $A_2$, of the outlet orifice; the area, $A_1$ of the communication means between regions and the hypothetical area $A_0'$ representing initial diaphragm stress, are interrelated according to the formula $$\frac{KA_0'}{l}+2P_0A_{d_0}+P_2A_{d_1}\left(\frac{A_2}{A_1}-1\right)-$$
$$[K/K_1A_{d_1}(2P_0-P_2)]=0$$

4. A constant pressure regulator comprising a chamber having an inlet orifice and an outlet orifice, a diaphragm separating said chamber into two regions and being positioned to close said inlet orifice, said diaphragm being deformable away from said inlet orifice to establish communication between said inlet orifice and one part of said chamber and means establishing communication between spaces of said chamber through said diaphragm wherein said last mentioned means is porous to facilitate the flow of fluid between said regions.

5. A constant pressure regulator according to claim 4 wherein said means establishing communication between said regions comprises an orifice in said diaphragm and a porous member interposed between said orifice and one of said regions.

6. A constant pressure regulator according to claim 4 additionally comprising a solid, non-porous member of lesser area than said diaphragm and secured to said diaphragm to cover said inlet orifice.

7. A constant pressure regulator according to claim 4 additionally comprising an annular lip surrounding said inlet orifice, and abutting said diaphragm in fluid equilibrium condition of said regulator.

References Cited

UNITED STATES PATENTS

| 213,118 | 3/1879 | Locke | 137—496 |
|---------|--------|-------|---------|
| 208,379 | 9/1879 | Downey | 137—496 |
| 2,497,906 | 2/1950 | Peters et al. | 137—496 |
| 2,938,538 | 5/1960 | Allen | 137—504 |
| 3,297,260 | 1/1967 | Barlow | 137—496 XR |

FOREIGN PATENTS

| 690,897 | 4/1953 | Great Britain. |

M. CARY NELSON, Primary Examiner

ROBERT J. MILLER, Assistant Examiner